(12) United States Patent
Shang et al.

(10) Patent No.: US 10,216,630 B1
(45) Date of Patent: Feb. 26, 2019

(54) SMART NAMESPACE SSD CACHE WARMUP FOR STORAGE SYSTEMS

(71) Applicant: EMC IP Holding Company LLC, Hopkinton, MA (US)

(72) Inventors: Pengju Shang, Milpitas, CA (US);
Murthy Mamidi, San Jose, CA (US);
Pranay Singh, San Ramon, CA (US);
George Mathew, Belmont, CA (US);
Englin Koay, Dublin, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/716,325

(22) Filed: Sep. 26, 2017

(51) Int. Cl.
*G06F 17/30* (2006.01)
*G06F 12/0866* (2016.01)
*G06F 12/0804* (2016.01)

(52) U.S. Cl.
CPC ...... *G06F 12/0804* (2013.01); *G06F 12/0866* (2013.01); *G06F 17/30082* (2013.01); *G06F 17/30132* (2013.01); *G06F 2212/1021* (2013.01); *G06F 2212/222* (2013.01); *G06F 2212/281* (2013.01)

(58) Field of Classification Search
CPC .............. G06F 12/0866; G06F 17/30132
See application file for complete search history.

(56) References Cited

U.S. PATENT DOCUMENTS

| | | | | |
|---|---|---|---|---|
| 6,463,509 B1 * | 10/2002 | Teoman | ............... | G06F 9/4401 711/113 |
| 2003/0120868 A1 * | 6/2003 | Royer, Jr. | ........... | G06F 12/0862 711/133 |
| 2006/0080401 A1 * | 4/2006 | Gill | ................... | G06F 17/30902 709/217 |
| 2008/0034195 A1 * | 2/2008 | Gilliam | ................. | G06F 9/4411 713/1 |
| 2013/0339406 A1 * | 12/2013 | Kanfi | ................ | G06F 17/30082 707/825 |
| 2015/0356110 A1 * | 12/2015 | Lin | ................... | G06F 17/30171 707/704 |
| 2018/0210832 A1 * | 7/2018 | Tang | ................... | G06F 12/0808 |
| 2018/0285275 A1 * | 10/2018 | Barczak | ............. | G06F 12/0871 |

* cited by examiner

*Primary Examiner* — Edward J Dudek, Jr.
(74) *Attorney, Agent, or Firm* — Womble Bond Dickinson (US) LLP

(57) ABSTRACT

In some embodiments, in response to receiving an indication to warm up a SSD cache, a system identifies namespace data of a file system to be warmed up separated from content data. The system identifies one or more namespace pages of the namespace data. For each of the one or more namespace pages, the system locks the namespace page in a read-only mode and determines if the namespace page is dirty. If the namespace page is dirty, the system releases the namespace page from the read-only mode without copying the namespace page to the SSD cache. If the page is clean (i.e., not dirty) then the system copies the namespace page to the SSD cache and releases the namespace page from the read-only mode to reduce cache misses of the namespace on the SSD cache.

20 Claims, 7 Drawing Sheets

SMART NAMESPACE SSD CACHE WARMUP FOR STORAGE SYSTEMS

FIELD OF THE INVENTION

Embodiments of the present invention relate generally to data storage systems. More particularly, embodiments of the invention relate to namespace SSD cache warmup for storage systems.

BACKGROUND

Namespace stores and manages all the files, directories, snapshots, and other attributes of file systems for storage systems. The speed and robustness of namespaces operations are critical to overall file system performance.

Intuitively, a cache layer can be added to boost the namespace performance. However, due to a limited cache space and a large and increasing namespace size, file system performance suffers due to a higher cache miss rate. There is a need to increase the namespace cache size to minimize the cache miss rate and to improve the overall file system performance.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a namespace SSD cache layer can be implemented with a directory manager of a file system to store namespace page data. To avoid a first round miss, a one-time proactive SSD cache warm up mechanism is used to warm up a SSD cache. The mechanism is transparent to the user as it is not performed by namespace requests. Rather the namespace SSD cache layer is warmed up in response to receiving an indication event such as a volume add event, a namespace roll backward/forward event, or an indication for an image snapshot demotion or promotion event.

In one embodiment, in response to receiving an indication to warm up a SSD cache, a system identifies namespace data of a filesystem to be warmed up separated from content data. The system identifies one or more namespace pages of the namespace data. For each of the one or more namespace pages, the system locks the namespace page in a read-only mode and determines if the namespace page is dirty. If the namespace page is dirty, the system releases the namespace page from the read-only mode without copying the namespace page to the SSD cache. If the page is clean (i.e., not dirty) then the system copies the namespace page to the SSD cache and releases the namespace page from the read-only mode to reduce cache misses of the namespace on the SSD cache.

Figure 1:
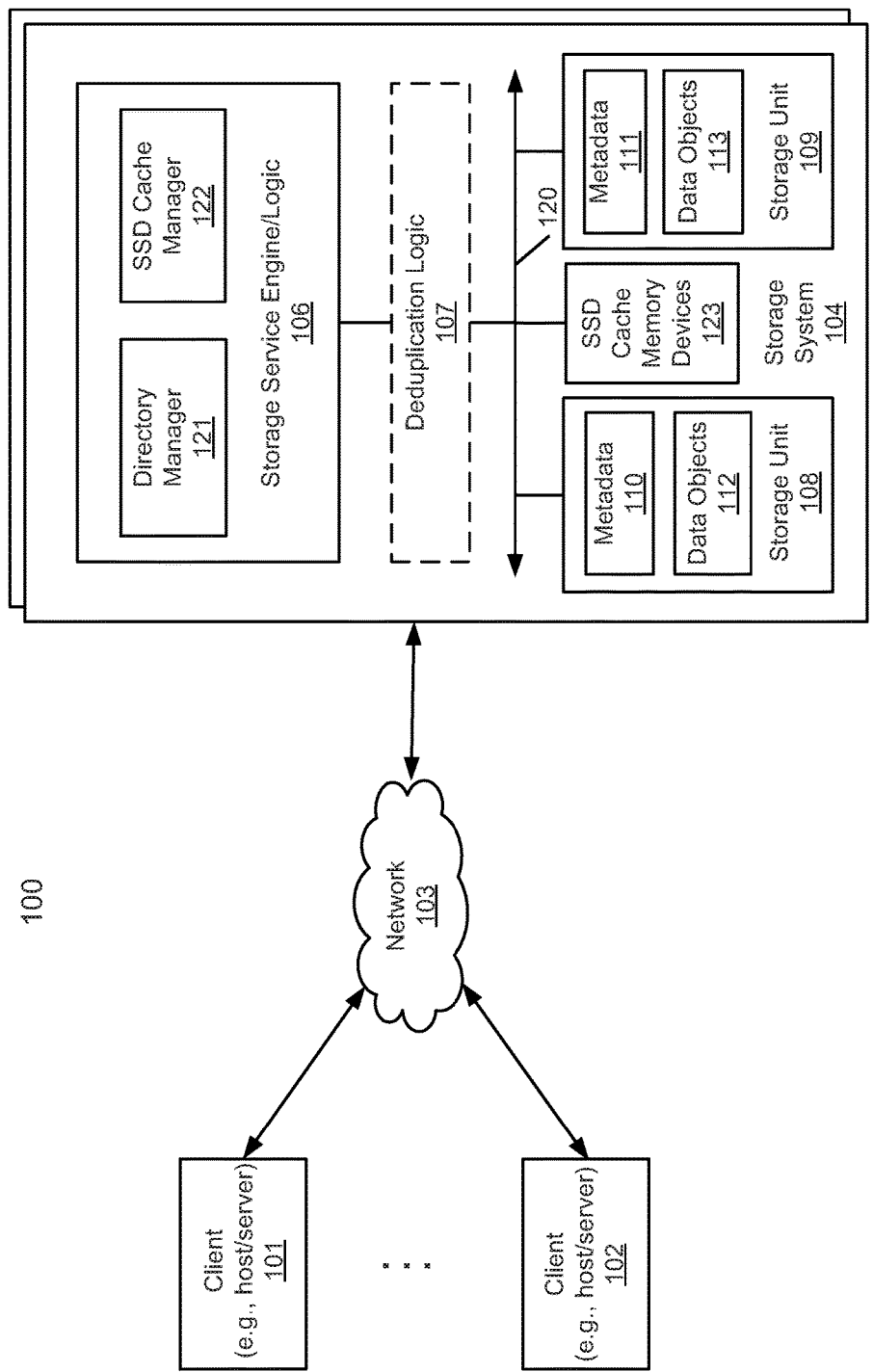
FIG. 1 is a block diagram illustrating a storage system according to one embodiment.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include directory manager 121 and SSD cache manager 122. Directory manager 121 is configured to manage file system and/or directory information from storage system 104. SSD cache manager 122 is configured to manage SSD devices such as SSD cache memory devices 123.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, storage system 104 includes SSD cache memory devices 123. SSD cache memory devices 123 may be implemented locally (e.g., single node operating environment) or remotely (e.g., multi-node operating environment) via interconnect 120. SSD cache memory devices 123 may include one or more solid state drive devices (SSDs) configured to store namespace data. New SSD devices can be added or removed dynamically. In response to a new SSD device being added as one of many SSD cache memory devices 123 of storage system 104, a storage layer of the file system broadcasts a volume add event. SSD cache manager 122 receives the event broadcast and communicates the broadcast to directory manager 121. Directory manager 121 then initiates a SSD cache warm up task or job to populate namespace data to the newly added SSD device.

Figure 2:
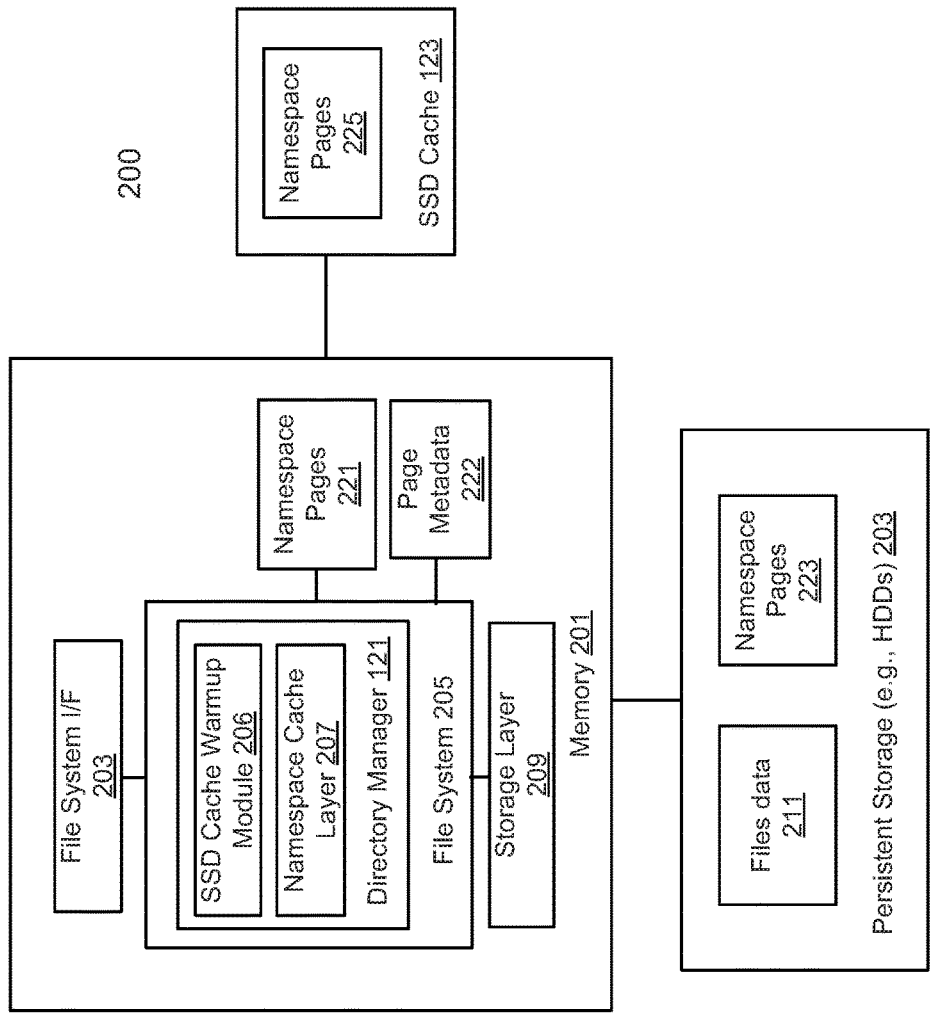
FIG. 2 is a block diagram illustrating a storage system according to one embodiment.

FIG. 2 is a block diagram illustrating a storage system according to one embodiment of the invention. Referring to FIG. 2, system 200 can be a primary storage system such as client 101 of FIG. 1 or a backup storage system such as storage system 104 of FIG. 1. System 200 includes, but is not limited to, memory 201, persistent storage 203 (e.g., hard drive disks), and SSD cache 123. Memory 201, which in one embodiment can be implemented via multiple memory devices to provide for a given amount of system memory. Memory 201 may include one or more volatile storage (or memory) devices such as random access memory (RAM), dynamic RAM (DRAM), synchronous DRAM (SDRAM), static RAM (SRAM), or other types of storage devices. Memory 201 may store information including applications and operating system files and any other sequences of instructions that can be executed by a processor of the storage system. For example, memory 201 can include file system 205, file system interface 202, storage layer 209, namespace pages 221 (e.g., namespaces information for file system 205), and pages metadata 222 (e.g., metadata information to flag modified namespace pages). File system 205 can include directory manager 121. Directory manager 121 can include warmup module 206 and SSD cache layer 207. Persistent storage 203 can include files data 211 and namespace pages 223. SSD cache 227 can include namespace pages 225.

When an operating system boots up, file system information for the operating system are loaded onto a system memory. Due to limited system memory, usually only partial file system information may be loaded on to the memory. For example, namespace pages 221 for a file system such as file system 205 can be loaded onto memory 201 that includes some but not all of the namespaces while namespace pages that are not loaded must be retrieved from persistent storage 203 (e.g., from namespace pages 223 via storage layer 209). When a user access a file and/or file directory from file system 205 via file system interface 202, such as browsing using a file browser application such as a windows explorer, directory manager 121 can traverse the namespace to retrieve one or more namespace pages, as part of namespace pages 221, from memory 201. The namespace pages information is returned to file system interface to be returned to the user. When a user modifies a file directory structure, changes to a namespace are reflected in namespace pages 221. Pages metadata 222 can flag the namespace pages which are modified so the changes can be propagated to persistent storage 203 and/or SSD cache 123. In one embodiment, directory manager 121 can be implemented with a namespace cache layer 207 such that when directory manager determines that requested namespace pages are not available from memory, directory manager 121 would fetch namespace pages from namespace cache layer 207. Namespace cache layer 207 directs the request to return data from namespace pages 225 from SSD cache 123. If the namespace pages are not available from the SSD cache 123, i.e., a SSD cache miss, directory manager 121 forwards the request to storage layer 209 to fetch the namespace pages data from persistent storage 203 (e.g., namespace pages 223). Note that namespace pages data (e.g., namespace pages 223) are separate from content data files (e.g., files data 211).

Figure 3:
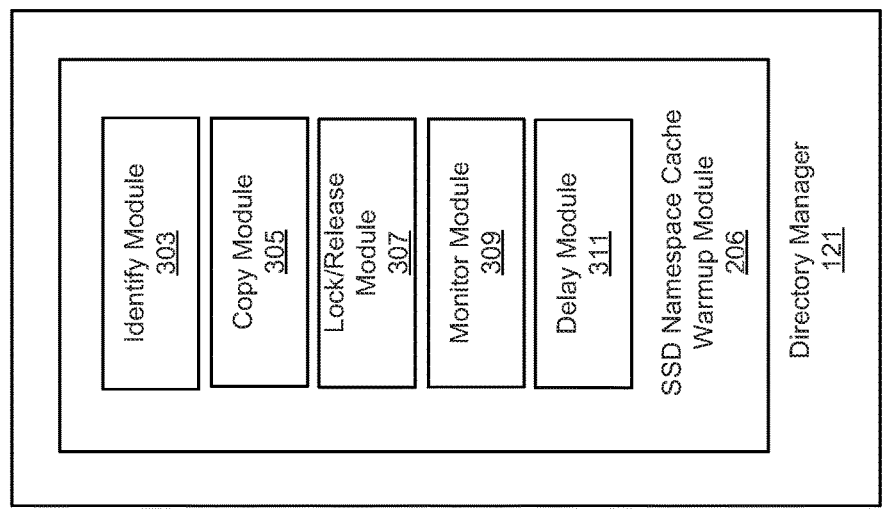
FIG. 3 is a block diagram illustrating a directory manager according to one embodiment.

FIG. 3 is a block diagram illustrating a directory manager according to one embodiment. Referring to FIG. 3, directory manager 121 includes, but is not limited to, SSD cache warmup module 206. SSD cache warmup module 206 warms up namespace pages data into a SSD cache just like warming up a regular cache device. SSD cache warmup module 206 includes identify module 303, copy module 305, lock/release module 307, monitor module 309, and delay module 311. These modules can be interpreted into fewer modules. Identify module 303 identifies one or more namespaces to be warmed up separated from file content data. In one embodiment, namespaces can be stored as a hierarchy of many data objects/files (e.g., BTree, MTree, etc.) or as a single file format. If the namespace is a hierarchy of many data objects, identify module 303 traverses the data hierarchy and generates a single namespace file.

In one embodiment, identify module 303 can determine if capacity sizes of the identified namespaces to be warmed up will be greater than a SSD capacity size for a SSD cache. If it is determined the namespace size is greater than the SSD cache size then the namespaces can be ranked. In some embodiments, a namespace and/or namespace pages is/are ranked based on its respective frequency of access. In some embodiments, a namespace and/or namespace pages is/are ranked based on a first in first out scheme. In another embodiment, only top ranked namespaces are identified to be warmed up to the SSD cache. Copy module 305 can copy a namespace file (or namespace pages) from persistent storage (e.g., HDD) to SSD cache. Copy module 305 can also flush namespace pages from memory to persistent storage (e.g., HDD) and/or memory to SSD cache, in the scenario when the namespace pages are being modified. Lock/release module 307 can lock and release a namespace page from a read-only mode. When a namespace page is locked in the read-only mode, the namespace page cannot be modified or deleted. When the read-only mode for the namespace page is released, the namespace page can be modified or deleted. The locking mechanism ensures namespace page data integrity while a namespace page is being copied from a source to a destination location.

When a warmup job is initiated, the directory manager continually monitors the warmup process, via monitor module 309, to ensure it is not consuming more system resources than necessary. Monitor module 309 can periodically monitor the network and system resources utilization, and/or SSD cache miss rate. Delay module 311 can inject a one-time delay or a periodic delay into the warmup task to free up network and/or system resources to yield the warmup task to other network/system tasks. In one embodiment, the periodic delay can be a delay based on a number of pages processed or a timed delay based on a time interval. For example, if a current cache miss rate is detected to be increasing by a first predetermined value or percentage value in comparison to a previous detected cache miss rate, monitor module 309 can request delay module 311 to inject a periodic delay into the warmup task for every predetermined namespace pages (e.g., 10 namespace pages) that are processed. If a current cache miss rate is detected to be decreasing by a second predetermined value or percentage value in comparison to a previous detected cache miss rate, monitor module 309 can request delay module 311 to remove or reduce a previous injected delay or reduce a delay for the warmup task. In some embodiments, a current cache miss rate is compared to an average cache miss rate to determine if the current cache miss rate is increasing or decreasing.

Figure 4A:
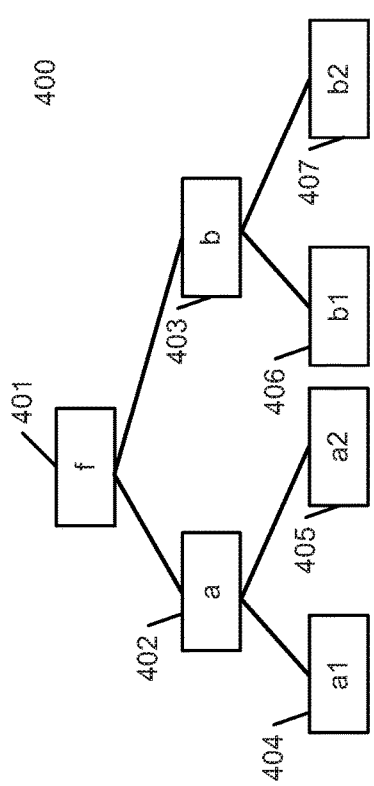
FIG. 4A is a block diagram illustrating a namespace in an MTree.
Figure 4B:
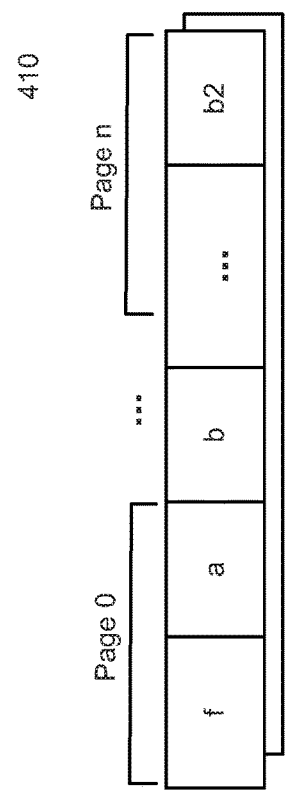
FIG. 4B is a block diagram illustrating pages of a single file namespace.

FIGS. 4A and 4B are block diagrams illustrating a namespace in a hierarchy tree and a flat file respectively. Referring to FIG. 4A, namespace 400 can be a set of symbols used to organize objects of various kinds such that these objects may be referred to by names. Some examples of namespaces are a file system directory, a computer network, distributed systems, or any data structures which can be referred to by names. Namespace is usually organized in a hierarchy so that a name can be reused in different context. In this example, namespace 400 is a file system directory organized in a hierarchy tree. Node 401 is the root of the tree. Node 401 includes nodes 402 and 403. Node 402 and 403 contain their respective branches 404-407. In this case, "a1" with the full file path "/f/a/a1" refers to node 404, and "b2" with file path "/f/b/b2 refers to node 407.

Referring to FIG. 4B, namespace 410 can be namespace 400 of FIG. 4A represented as a single file. Namespace 410 is organized in a sequence recognized by a file system reader. Namespace 410 includes one or more pages, pages 0..n. Namespaces are organized in pages of data so reads and writes to the namespace can be managed by a directory manager. For example, namespace page data can be copied from persistent storage to SDD cache in increments of pages. Pages can be locked and released so that the storage system can ensure page data will continue to be consistent after it is being transferred. In one embodiment, if the file system organizes namespace in separate files or a hierarchy of files, a directory manager, such as directory manager 121 of FIG. 2, organizes the namespaces hierarchy files into a single file having one or more page data. A single file namespace would alleviate the tasks to traverse the namespace hierarchy nodes or hierarchy tree branches prior to copying the namespace from a persistent storage to a SSD cache.

Figure 5:
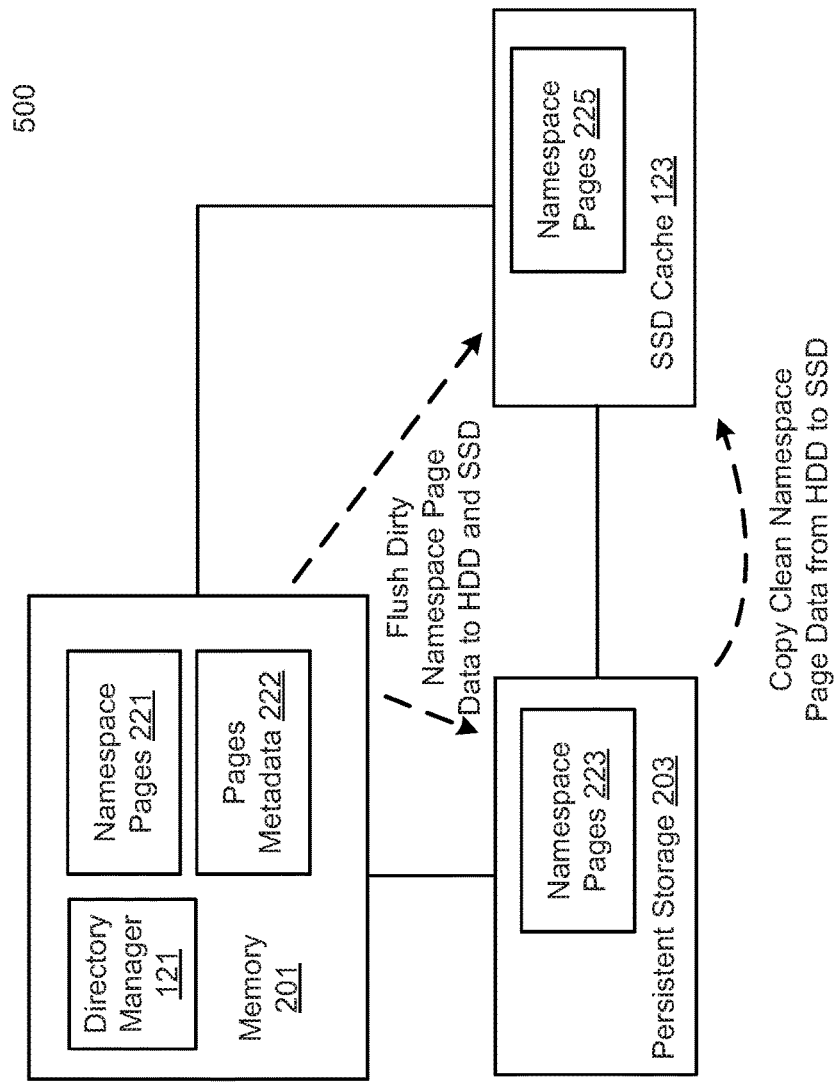
FIG. 5 is a block diagram illustrating an exemplary copying mechanism according to one embodiment.

FIG. 5 is a block diagram illustrating an exemplary copying mechanism according to one embodiment. Referring to FIG. 5, system 500 is similar to system 200 of FIG. 2. In one embodiment, namespace pages can be copied from persistent storage 203 to SSD cache 123 (e.g., SSD devices). In another embodiment, namespace pages can be flushed from memory 201 to persistent storage 203 and/or SSD cache 123. For example, when a warmup task initiates, directory manager 121 determines if a namespace page, via a lookup from pages metadata 222, is dirty (i.e., modified). A "dirty" namespace page refers to a namespace page that has been modified on system memory but a previous version of the namespace page still resides on persistent storage yet to be updated by the system. If directory manager 121 determines the namespace page is clean (or not dirty) then the namespace page is copied from persistent storage 203 to SSD cache 123. If directory manager 121 determines the namespace page is dirty then a modified version of the namespace page stored in memory 201 are flushed from memory 201 to persistent storage 203 and/or SSD cache 123.

In one embodiment, namespaces or subsets thereof with no semantic overlap (e.g., different root nodes or a subset of namespaces having no overlap branches) can be warmed up to a SSD cache with more than one warm up jobs/tasks, each of the jobs/tasks performed by a different processor or processing thread such that warmup tasks can be performed concurrently. In one embodiment, one or more warmup jobs/tasks are initiated or scheduled to run when directory manager 121 receives an indication of a new SSD volume add event such as when a new SSD device is added.

In some embodiments, storage system 500 supports online and/or offline namespace recovery and/or time shift features, such as namespace rolling forward or backward, and/or snapshot reversion or promotion. In one embodiment, one or more warmup jobs/tasks are initiated or scheduled to run when directory manager 121 receives an indication of a namespace roll forward/backward event. For example, storage system 500 can store many versions of namespace data (e.g., as BTree pages) in persistent storage 203. When storage system 500 receives an indication to roll forward or backward a namespace data, versions of some namespace pages would change accordingly at the storage layer. These changes thereafter are warmed up to the SSD cache 123 via one or more SSD cache warm up tasks. In one embodiment, one or more warmup jobs/tasks are initiated or scheduled to run when directory manager 121 receives an indication of a snapshot reversion or promotion event. For example, storage system 500 can store many snapshot images each having a time shifted namespace data. When storage system 500 receives an indication to reverse or promote a snapshot, a snapshot is loaded and namespace data for the loaded snapshot would be warmed up to the SSD cache 123 via one or more SSD cache warm up tasks.

Figure 6:
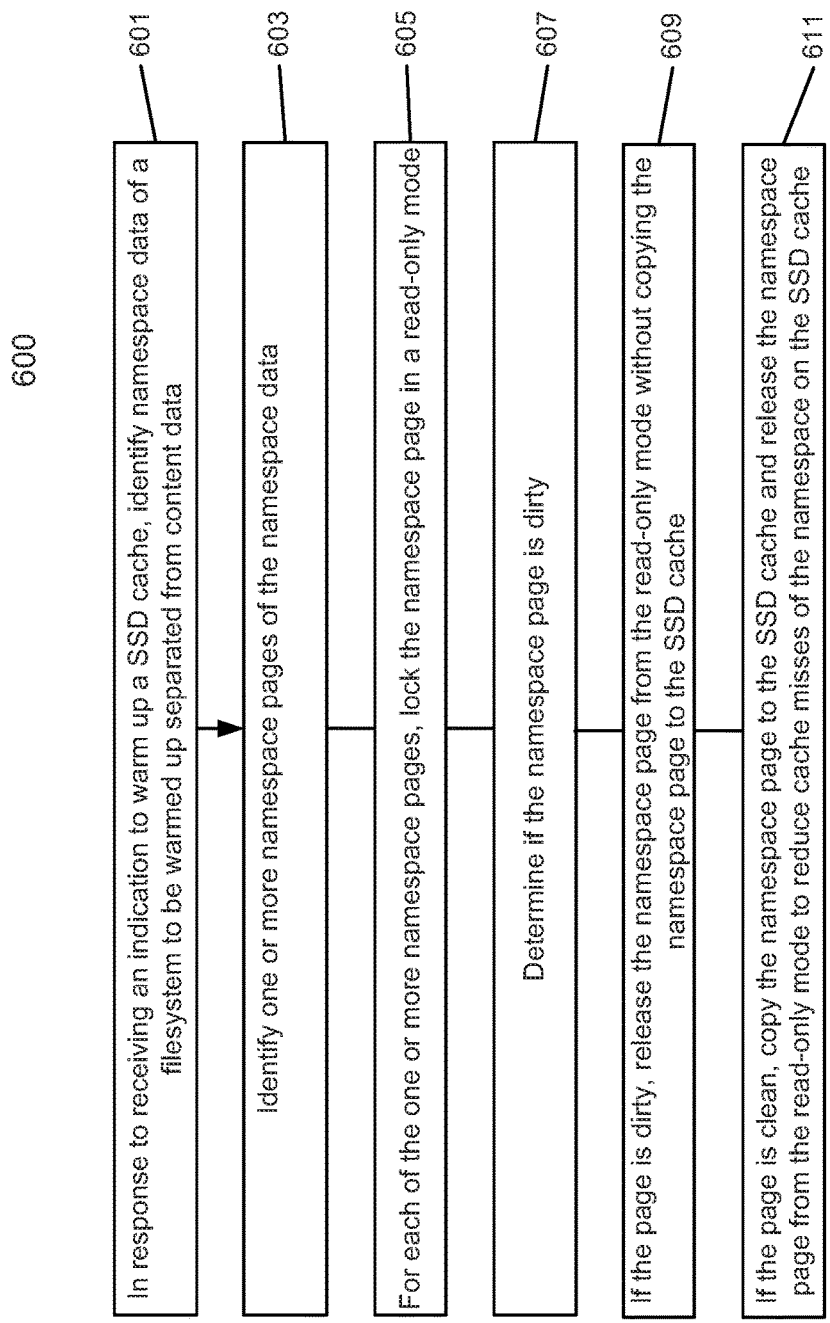
FIG. 6 is a flow diagram illustrating a method to warm up a SSD cache according to one embodiment.

FIG. 6 is a flow diagram illustrating a process of 600 according to one embodiment of the invention. Process 600 may be performed by processing logic that includes hardware (e.g. circuitry, dedicated logic, etc.), software (e.g., embodied on a non-transitory computer readable medium), or a combination thereof. For example, process 600 may be performed by directory manager 121 of FIG. 2. Referring to FIG. 6, at block 601, in response to receiving an indication to warm up a SSD cache, processing logic identifies namespace data of a filesystem to be warmed up separated from content data. At block 603, processing logic identifies one or more namespace pages of the namespace data. At block 605, for each of the one or more namespace pages, processing logic locks the namespace page in a read-only mode. At block 607, processing logic determines if the namespace page is dirty. At block 609, if the namespace page is dirty, processing logic releases the namespace page from the read-only mode without copying the namespace page to the SSD cache. At block 611, if the namespace page is clean, processing logic copies the namespace page to the SSD cache and releases the namespace page from the read-only mode to reduce cache misses of the namespace on the SSD cache.

In one embodiment, identifying namespace data of a filesystem to be warmed up includes determining a data capacity size of the one or more namespace pages and determining a capacity size of a SSD cache to be warmed up. If the data capacity size of the one or more namespace pages is determined to be greater than the capacity size of the SSD cache to be warmed up, processing logic ranks each of the one or more namespace pages based on a frequency of access relative to other namespace pages. Processing logic identifies the one or more namespace pages to be warmed up based on the ranking such that frequently accessed namespace pages have a higher priority to be warmed up.

In one embodiment, receiving an indication to warm up the SSD cache includes detecting a new SSD cache device added. In another embodiment, detecting a new SSD cache device added comprises receiving an indication of a SSD volume create event. In another embodiment, receiving an indication to warm up the SSD cache includes receiving an indication to roll back a namespace, an indication to roll forward a namespace, an indication for a snapshot reversion for the filesystem, or an indication for a snapshot promotion for the filesystem. In one embodiment, processing logic further purges the SSD cache of any existing data.

In one embodiment, processing logic further monitors a cache miss rate for the SSD cache. If a current cache miss rate is determined to be increasing in comparison to a previous cache miss rate by a first predetermined percentage, throttling the SSD cache warm up by delaying a time to warm up the SSD cache by a first predetermined time interval to minimize performance impact to the storage system. If the current cache miss rate is determined to be decreasing in comparison to a previous cache miss rate by a second predetermined percentage, reducing the delay to the time to warm up the SSD cache by a second predetermined time interval. In another embodiment, the cache miss rate for the SSD cache is monitored periodically at a predetermined time interval. In another embodiment, the current cache miss rate is compared to an average cache miss rate of previously monitored cache miss rates to determine if the current cache miss rate is increasing or decreasing.

Note that some or all of the components as shown and described above (e.g., directory manager 121 and SSD cache manager 122 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
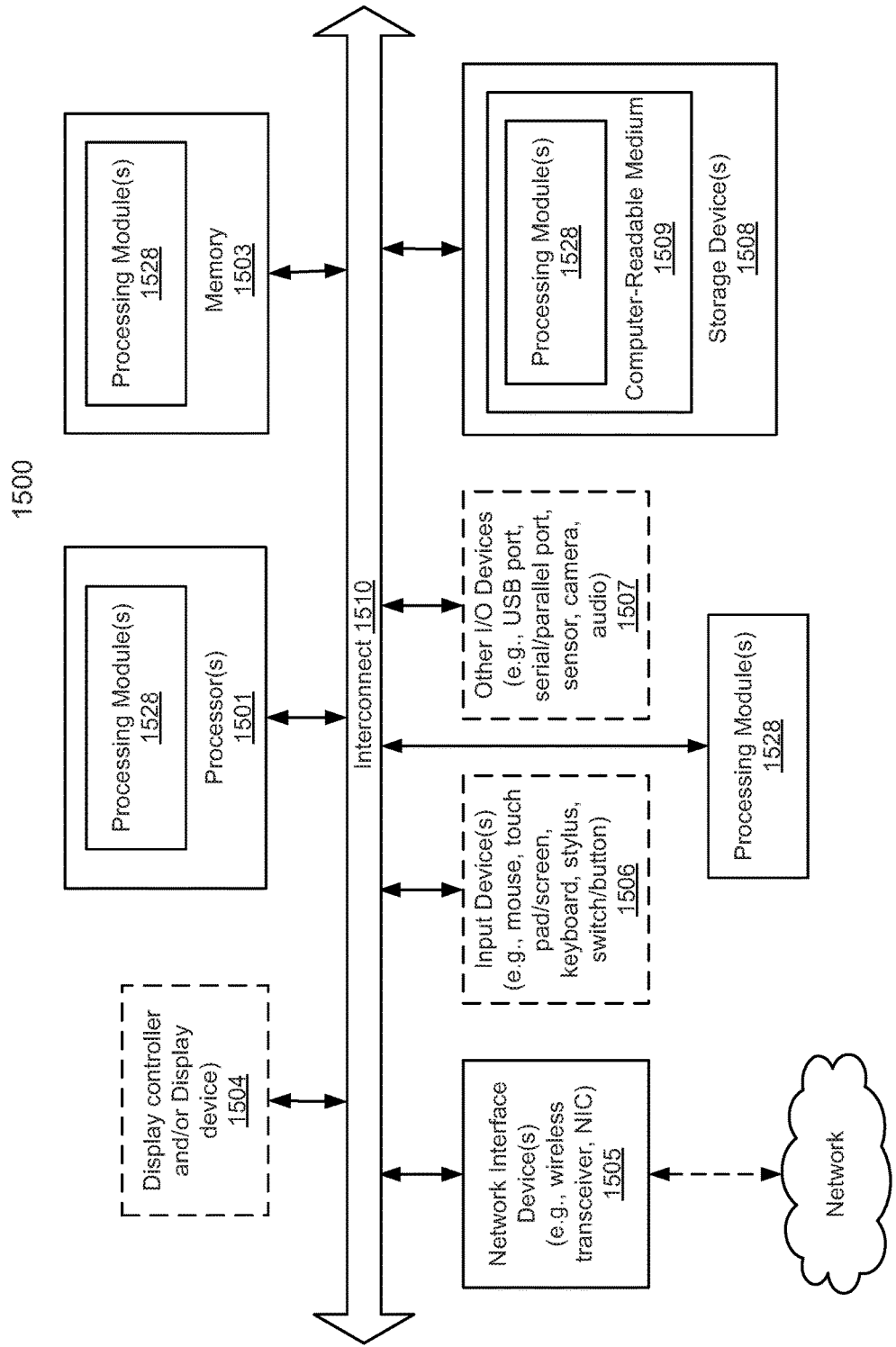
FIG. 7 is a block diagram illustrating a data processing system according to one embodiment.

FIG. 7 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a directory manager, a SSD cache layer, a warmup module, storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for solid state drive (SSD) cache warm up for a storage system, the method comprising:
   in response to receiving an indication to warm up a SSD cache, identifying namespace data of a filesystem to be warmed up separated from content data;
   identifying one or more namespace pages of the namespace data;
   for each of the one or more namespace pages,
      locking the namespace page in a read-only mode;
      determining if the namespace page is dirty;
      if the namespace page is dirty, releasing the namespace page from the read-only mode without copying the namespace page to the SSD cache; and
      if the page is clean, copying the namespace page to the SSD cache and releasing the namespace page from the read-only mode to reduce cache misses of the namespace on the SSD cache.

2. The method of claim 1, wherein identifying one or more namespace pages of the namespace data comprises:
   determining a data capacity size of the one or more namespace pages;
   determining a capacity size of a SSD cache to be warmed up; and
   if the data capacity size of the one or more namespace pages is determined to be greater than the capacity size of the SSD cache to be warmed up,
      ranking each of the one or more namespace pages based on a frequency of access relative to other namespace pages;
      identifying the one or more namespace pages to be warmed up based on the ranking such that frequently accessed namespace pages have a higher priority to be warmed up.

3. The method of claim 1, wherein receiving an indication to warm up the SSD cache comprises detecting a new SSD cache device added.

4. The method of claim 3, wherein detecting a new SSD cache device added comprises receiving an indication of a SSD volume create event.

5. The method of claim 1, wherein receiving an indication to warm up the SSD cache comprises receiving an indication to roll back a namespace, an indication to roll forward a namespace, an indication for a snapshot reversion for the filesystem, or an indication for a snapshot promotion for the filesystem.

6. The method of claim 1, further comprising:
   monitoring a cache miss rate for the SSD cache;
   if a current cache miss rate is determined to be increasing in comparison to a previous cache miss rate by a first predetermined percentage, throttling the SSD cache warm up by delaying a time to warm up the SSD cache by a first predetermined time interval to minimize performance impact to the storage system; and
   if the current cache miss rate is determined to be decreasing in comparison to a previous cache miss rate by a second predetermined percentage, reducing the delay to the time to warm up the SSD cache by a second predetermined time interval.

7. The method of claim 6, wherein the cache miss rate for the SSD cache is monitored periodically at a predetermined time interval.

8. The method of claim 6, wherein the current cache miss rate is compared to an average cache miss rate of previously monitored cache miss rates to determine if the current cache miss rate is increasing or decreasing.

9. A non-transitory machine-readable medium having instructions stored therein, which when executed by a processor, cause the processor to perform operations to sort data elements in a data array, the operations comprising:
    in response to receiving an indication to warm up a SSD cache, identifying namespace data of a filesystem to be warmed up separated from content data;
    identifying one or more namespace pages of the namespace data;
    for each of the one or more namespace pages,
        locking the namespace page in a read-only mode;
        determining if the namespace page is dirty;
        if the namespace page is dirty, releasing the namespace page from the read-only mode without copying the namespace page to the SSD cache; and
        if the page is clean, copying the namespace page to the SSD cache and releasing the namespace page from the read-only mode to reduce cache misses of the namespace on the SSD cache.

10. The non-transitory machine-readable medium of claim 9, wherein identifying one or more namespace pages of the namespace data comprises:
    determining a data capacity size of the one or more namespace pages;
    determining a capacity size of a SSD cache to be warmed up; and
    if the data capacity size of the one or more namespace pages is determined to be greater than the capacity size of the SSD cache to be warmed up,
        ranking each of the one or more namespace pages based on a frequency of access relative to other namespace pages;
        identifying the one or more namespace pages to be warmed up based on the ranking such that frequently accessed namespace pages have a higher priority to be warmed up.

11. The non-transitory machine-readable medium of claim 9, wherein receiving an indication to warm up the SSD cache comprises detecting a new SSD cache device added.

12. The non-transitory machine-readable medium of claim 11, wherein detecting a new SSD cache device added comprises receiving an indication of a SSD volume create event.

13. The non-transitory machine-readable medium of claim 9, wherein receiving an indication to warm up the SSD cache comprises receiving an indication to roll back a namespace, an indication to roll forward a namespace, an indication for a snapshot reversion for the filesystem, or an indication for a snapshot promotion for the filesystem.

14. The non-transitory machine-readable medium of claim 9, further comprising:
    monitoring a cache miss rate for the SSD cache;
    if a current cache miss rate is determined to be increasing in comparison to a previous cache miss rate by a first predetermined percentage, throttling the SSD cache warm up by delaying a time to warm up the SSD cache by a first predetermined time interval to minimize performance impact to the storage system; and
    if the current cache miss rate is determined to be decreasing in comparison to a previous cache miss rate by a second predetermined percentage, reducing the delay to the time to warm up the SSD cache by a second predetermined time interval.

15. The non-transitory machine-readable medium of claim 14, wherein the cache miss rate for the SSD cache is monitored periodically at a predetermined time interval.

16. The non-transitory machine-readable medium of claim 14, wherein the current cache miss rate is compared to an average cache miss rate of all previously monitored cache miss rates to determine if the current cache miss rate is increasing or decreasing.

17. A data processing system, comprising:
    a processor; and
    a memory coupled to the processor to store instructions, which when executed by the processor, cause the processor to perform operations, the operations including
        in response to receiving an indication to warm up a SSD cache, identifying namespace data of a filesystem to be warmed up separated from content data;
        identifying one or more namespace pages of the namespace data;
        for each of the one or more namespace pages,
            locking the namespace page in a read-only mode;
            determining if the namespace page is dirty;
            if the namespace page is dirty, releasing the namespace page from the read-only mode without copying the namespace page to the SSD cache; and
            if the page is clean, copying the namespace page to the SSD cache and releasing the namespace page from the read-only mode to reduce cache misses of the namespace on the SSD cache.

18. The system of claim 17, wherein identifying one or more namespace pages of the namespace data comprises:
    determining a data capacity size of the one or more namespace pages;
    determining a capacity size of a SSD cache to be warmed up; and
    if the data capacity size of the one or more namespace pages is determined to be greater than the capacity size of the SSD cache to be warmed up,
        ranking each of the one or more namespace pages based on a frequency of access relative to other namespace pages;
        identifying the one or more namespace pages to be warmed up based on the ranking such that frequently accessed namespace pages have a higher priority to be warmed up.

19. The system of claim 17, wherein receiving an indication to warm up the SSD cache comprises detecting a new SSD cache device added.

20. The system of claim 19, wherein detecting a new SSD cache device added comprises receiving an indication of a SSD volume create event.

* * * * *